(12) United States Patent
Sanyal et al.

(10) Patent No.: US 11,662,249 B2
(45) Date of Patent: May 30, 2023

(54) SYSTEM FOR TESTING UNDER CONTROLLED EMULATED ATMOSPHERIC CONDITIONS

(71) Applicant: The United States of America, as represented by the Secretary of the Navy, Crane, IN (US)

(72) Inventors: Subrata Sanyal, Eastvale, CA (US); Joseph A. Fiordilino, Corona, CA (US)

(73) Assignee: The United States of America, as Represented by the Secretary of the Navy, Washington, DC (US)

(*) Notice: Subject to any disclaimer, the term of this patent is extended or adjusted under 35 U.S.C. 154(b) by 421 days.

(21) Appl. No.: 16/839,254

(22) Filed: Apr. 3, 2020

(65) Prior Publication Data

US 2021/0096021 A1    Apr. 1, 2021

Related U.S. Application Data

(60) Provisional application No. 62/829,855, filed on Apr. 5, 2019.

(51) Int. Cl.
*G01J 1/02* (2006.01)
*G01T 7/00* (2006.01)

(52) U.S. Cl.
CPC .............. *G01J 1/0252* (2013.01); *G01T 7/00* (2013.01)

(58) Field of Classification Search
CPC .......... G01J 1/0252; G01J 1/0271; G01T 7/00
See application file for complete search history.

(56) References Cited

U.S. PATENT DOCUMENTS

| | | | | |
|---|---|---|---|---|
| 5,228,209 A | * | 7/1993 | Brunner | F26B 7/00 34/73 |
| 5,414,345 A | * | 5/1995 | Rogers | G01R 29/0814 324/637 |
| 6,384,612 B2 | * | 5/2002 | Freund | G01J 1/0422 324/754.23 |
| 10,812,788 B1 | * | 10/2020 | Mishra | H04N 5/2351 |
| 2002/0168289 A1 | * | 11/2002 | McVey | A61L 2/208 422/108 |
| 2008/0055583 A1 | * | 3/2008 | Lecomte | G01B 11/162 356/32 |
| 2009/0236334 A1 | * | 9/2009 | Ben-Shmuel | H05B 6/688 219/703 |
| 2014/0265823 A1 | * | 9/2014 | Boisseau | H01J 47/02 313/621 |

(Continued)

FOREIGN PATENT DOCUMENTS

CN    102121893 A  *  7/2011
CN    102385039 A  *  3/2012
(Continued)

*Primary Examiner* — Marcus H Taningco
(74) *Attorney, Agent, or Firm* — Naval Surface Warfare Center, Crane Division

(57) ABSTRACT

Exemplary embodiments include at least one modular container that can be assembled to emulate a desired atmosphere. Each container includes apertures on opposing ends of the container to allow EMR to enter and exit the container. Each container can include temperature control systems, humidity control systems, fan arrays to emulate wind/turbulence, and a plurality of sensors to measure the current conditions within the container, all of which can be installed within the containers walls.

2 Claims, 8 Drawing Sheets

(56) References Cited

U.S. PATENT DOCUMENTS

| | | | | |
|---|---|---|---|---|
| 2016/0206493 | A1* | 7/2016 | Rapoport | A61M 16/161 |
| 2018/0320122 | A1* | 11/2018 | Blanchard | C12M 23/50 |
| 2018/0352719 | A1* | 12/2018 | Dammen | A01N 43/56 |
| 2019/0141911 | A1* | 5/2019 | Nguyen | F21V 29/50 |
| | | | | 165/64 |
| 2019/0211295 | A1* | 7/2019 | Liu | C12M 41/44 |
| 2019/0360924 | A1* | 11/2019 | Macrelli | G01N 33/0031 |

FOREIGN PATENT DOCUMENTS

| | | | | | |
|---|---|---|---|---|---|
| CN | 102805039 | A | * | 12/2012 | |
| CN | 213091452 | U | * | 4/2021 | |
| GB | 2488569 | A | * | 9/2012 | G01J 1/02 |

* cited by examiner

SYSTEM FOR TESTING UNDER CONTROLLED EMULATED ATMOSPHERIC CONDITIONS

CROSS-REFERENCE TO RELATED APPLICATIONS

The present application claims priority to U.S. Provisional Patent Application Ser. No. 62/829,855, filed Apr. 5, 2019, entitled "System For Testing Under Controlled Emulated Atmospheric Conditions," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,623) is assigned to the United States Government and is available for licensing for commercial purposes. Licensing and technical inquiries may be directed to the Technology Transfer Office, Naval Surface Warfare Center, Corona Division, email: CRNA_CTO@navy.mil.

FIELD OF THE INVENTION

The present invention relates to an enclosure for testing electromagnetic radiation under simulated atmospheric conditions.

BACKGROUND AND SUMMARY OF THE INVENTION

The present invention relates to an enclosure for testing electromagnetic radiation (EMR) by emulating atmospheric conditions within the enclosure.

According to an illustrative embodiment of the present disclosure, at least one modular container can be assembled to emulate a desired atmosphere. Each container includes apertures on opposing ends of the container to allow EMR to enter and exit the container. Each container can include temperature control systems (e.g., a hot plate, a hot wire, a cold plate, etc.), humidity control systems (e.g., a humidifier, a dehumidifier), fan arrays to emulate wind/turbulence, and a plurality of sensors to measure the current conditions within the container. These control systems allows for variation of different measurement parameters (e.g., temperature, humidity, wind-speed, etc.) independently or in any combination of these to achieve different statistically steady atmospheric conditions inside the container.

According to a further illustrative embodiment of the present disclosure, containers can be aligned to combine the containers linearly (e.g., to test across longer distances) or stacked to combine containers vertically/horizontally (e.g., to allow more complex atmospheric conditions). The walls of these containers could be made of collapsible shutters for the ease of open/close control. Once a desired statistically steady atmospheric condition is reached in each of the stacked containers, the shutters in between them could be opened to emulate the condition in longer distances or larger volumes.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
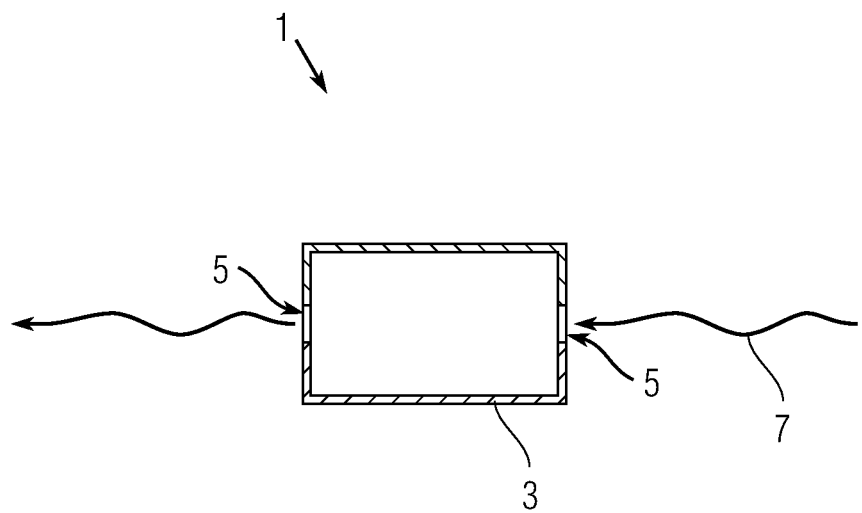
FIG. 1 shows an exemplary emulation system.

FIG. 1 shows an exemplary emulation system 1 having an emulation container 3. Container 3 has two apertures 5 on opposing sides of the container. An EMR beam 7 can be propagated through the container by entering a first aperture and exiting a second aperture. EMR power, beam quality, beam profile, etc. can be measured, and the resulting data can be utilized to test models and create new models. Because longer optical paths provide better analysis of EMR beams, each container 3 is generally longer (e.g., from aperture to aperture) than wide or tall.

Figure 2:
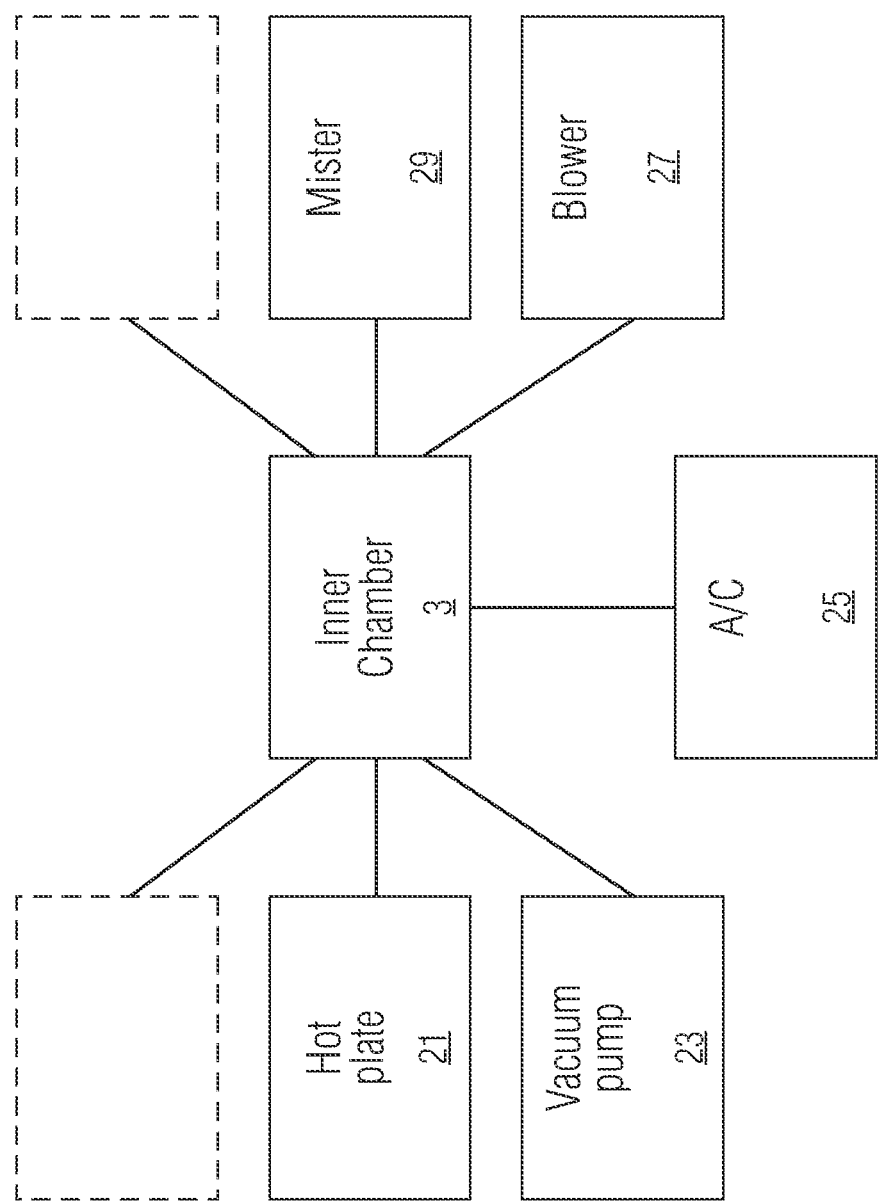
FIG. 2 shows a block diagram of the components of an exemplary emulation system.

FIG. 2 shows a block diagram of the components of an exemplary emulation system. A plurality of peripheral systems can be coupled to the walls of container 3 to enable a variety of functions or precision control. Peripheral systems can include a vacuum pump 23, humidity control mechanisms (e.g., humidifier 29), temperature control mechanisms (e.g., a heating element 21 and cooling element 25), and at least one fan 27.

Figure 3A:
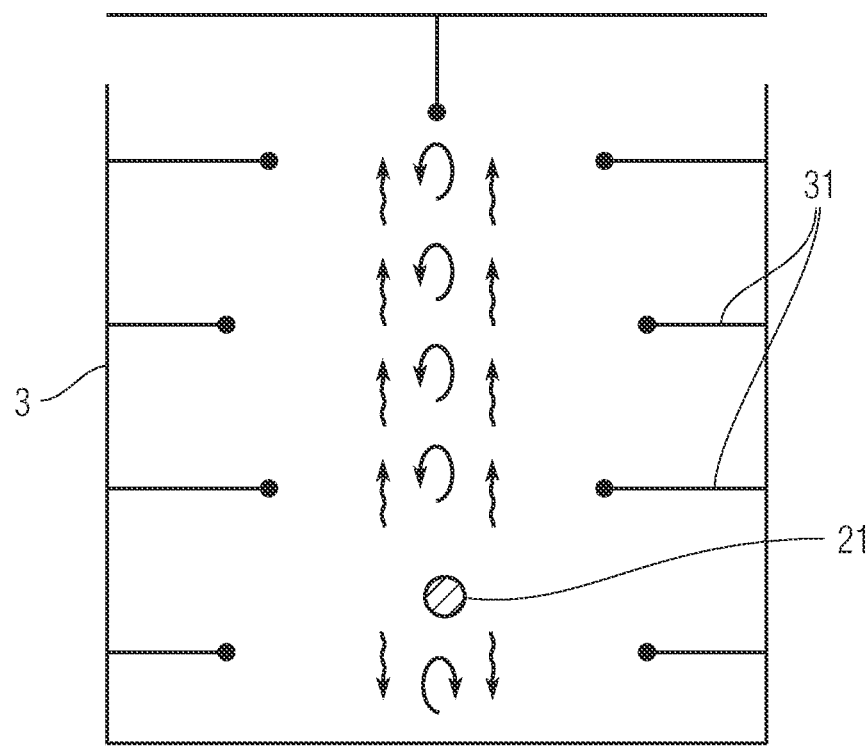
FIGS. 3A-B show additional views of an exemplary container with a heating element.
Figure 3B:
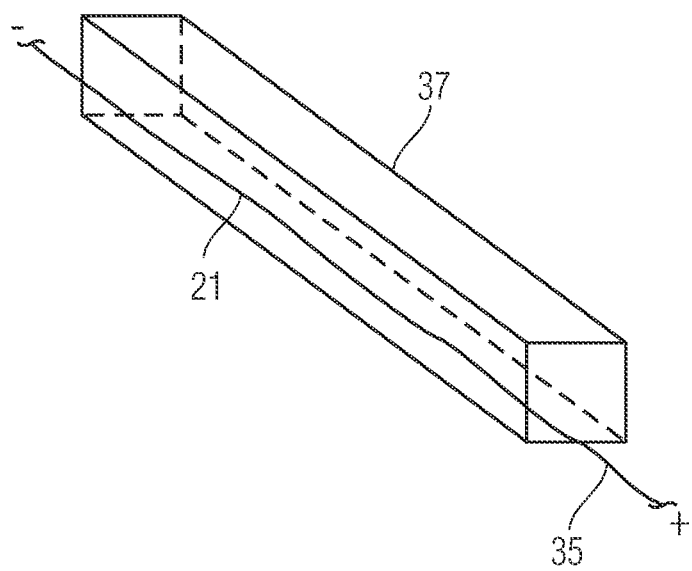

FIGS. 3A-B show additional views of an exemplary container 3 with a heating element 21 (e.g., a wire with an electrical current 35 passing through the wire). The wind speed, temperature, pressure, and humidity can be measured by well-known measurement devices (e.g., hygrometers, sonic anemometer, etc.) traceable to known measurement standards. In exemplary embodiments, a controller can be configured to activate container peripherals until particular readings are recorded by sensors 31 (e.g., activate a heating element until a particular temperature is reached). It is generally preferable to put the heating element in the bottom of the container 3 (and likewise cooling elements in the top of the container) for better temperature regulation.

Figure 4:
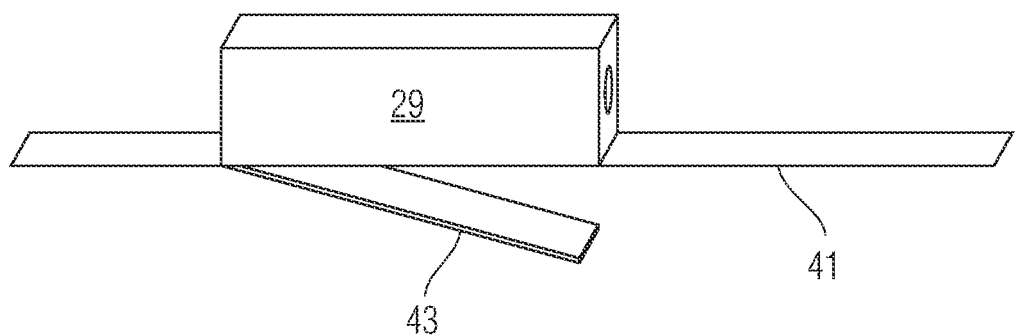
FIG. 4 shows a top section of an exemplary container.

FIG. 4 shows a top section of an exemplary container with a humidifier 29 installed within top wall 41. It is generally preferable to put the humidifier 29 in the top section to facilitate dispersal of water vapor throughout the container. A seal 43 prevents the humidifier 29 from interacting with the internal air when EM beam is operating or when humidity levels have been satisfactorily achieved.

Figure 5:
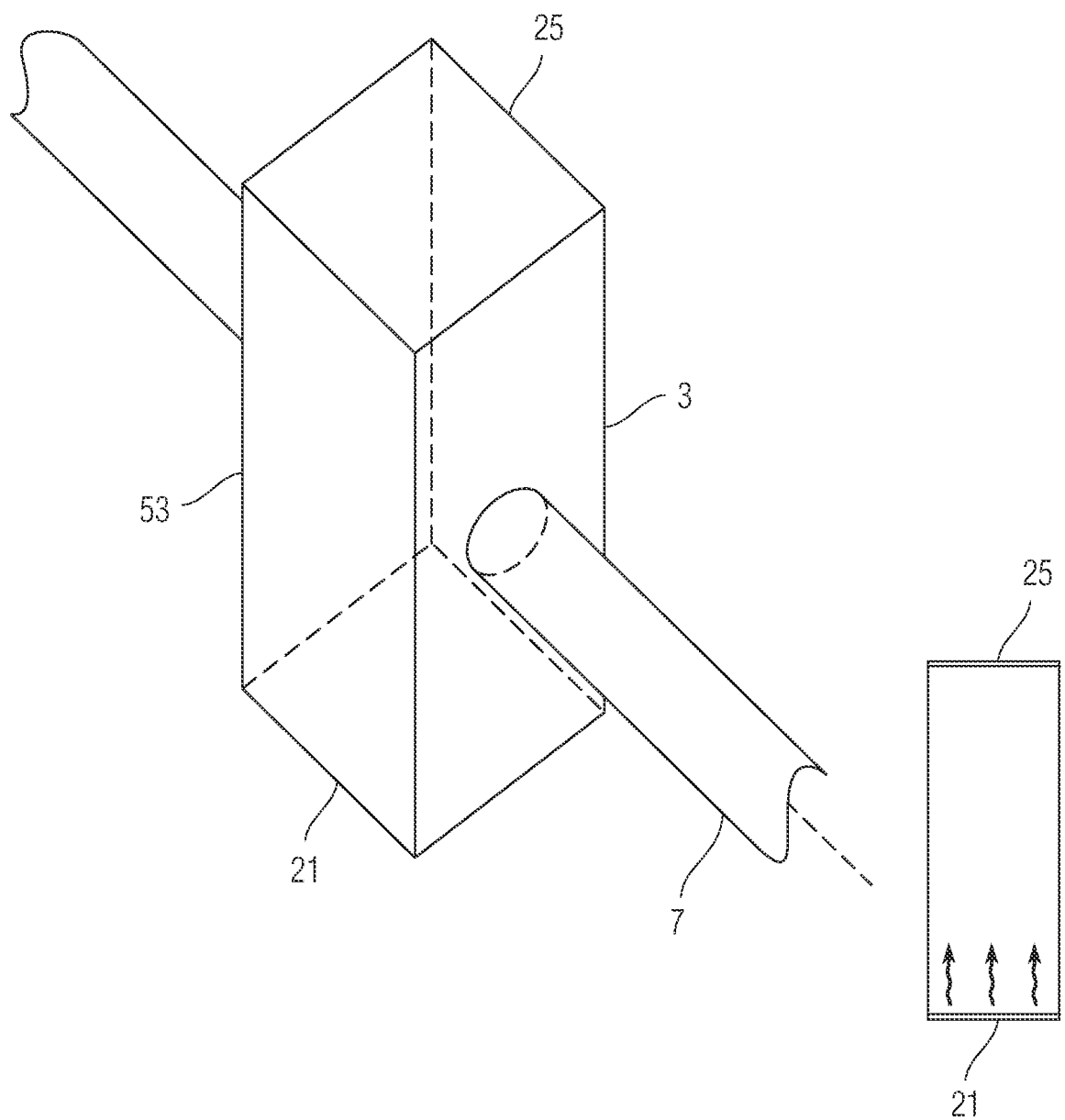
FIG. 5 shows an isometric view of an exemplary container.

FIG. 5 shows an isometric view of an exemplary container 3. The bottom interior surface of container 3 is a heating element 21 (e.g., a hot plate) and the top interior surface of container 3 is a cooling element 25 (e.g., a cold plate). Side walls 53 are insulated so that the temperature within container 3 can be more precisely controlled, and the system can be used in a variety of laboratory settings.

Figure 6A:
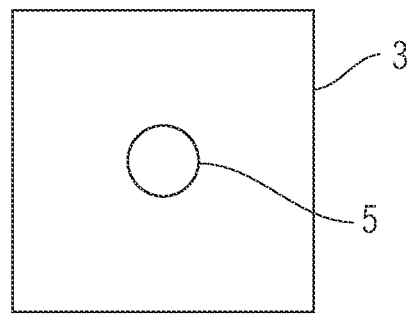
FIG. 6A-C shows exterior views of an exemplary container.
Figure 6B:
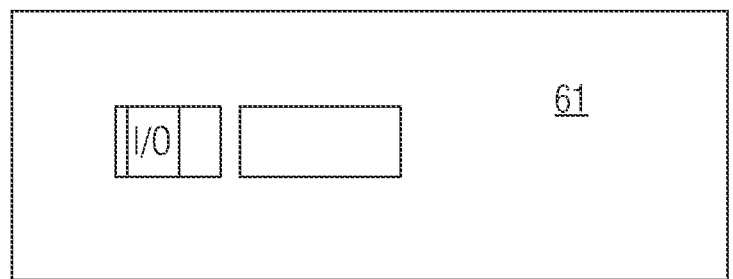
Figure 6C:
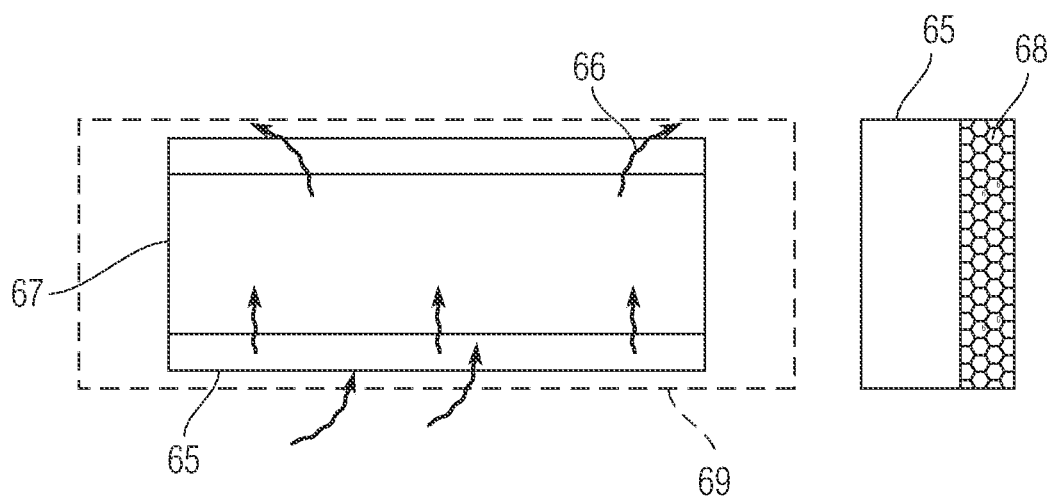

FIGS. 6A-C shows exterior views of an exemplary container 3. FIG. 6A shows a front/back view of a container 3 with aperture 5. FIG. 6B shows an input/out panel 63 and control panel 61 placed on the exterior surface of a container side. FIG. 6C shows a top down view of a container with the top side removed. Fan arrays 65 can be configured to blow air into the container on a first side and out of the container on a second opposing side. It is generally preferable to put the fan arrays 65 on the side walls of container 3 to better emulate wind effects.

Figure 7A:
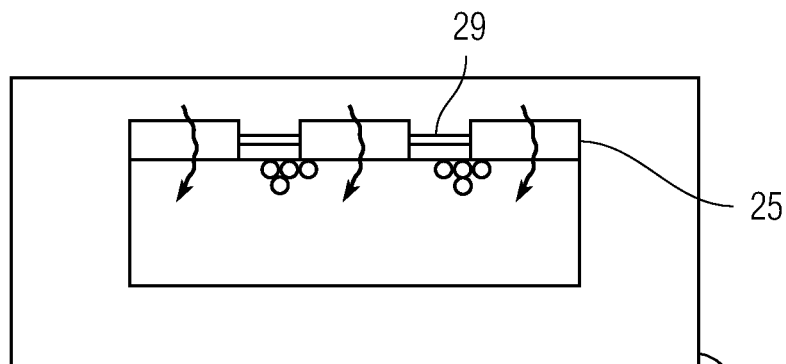
FIGS. 7A-C show a cross sectional views of an exemplary container.
Figure 7B:
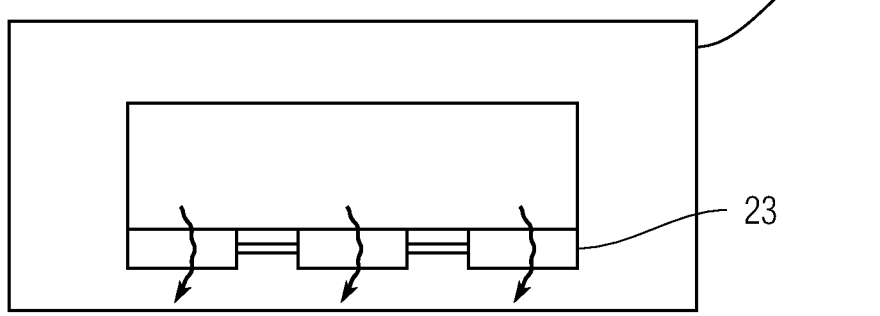
Figure 7C:
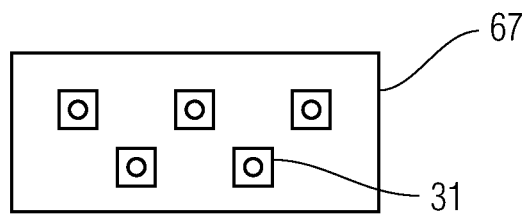

FIGS. 7A-C show a cross sectional side views of an exemplary container 3. Humidifier 29 and cooling element 25 are placed in the top section of the container so that the water vapor and cooled air will sink. Vacuum pumps 23 are placed in the bottom section of the container to remove air/water vapor from the container. Interior wall 67 can have embedded sensors 31 (e.g., to measure temperature, pressure, water content, etc.).

Figure 8:
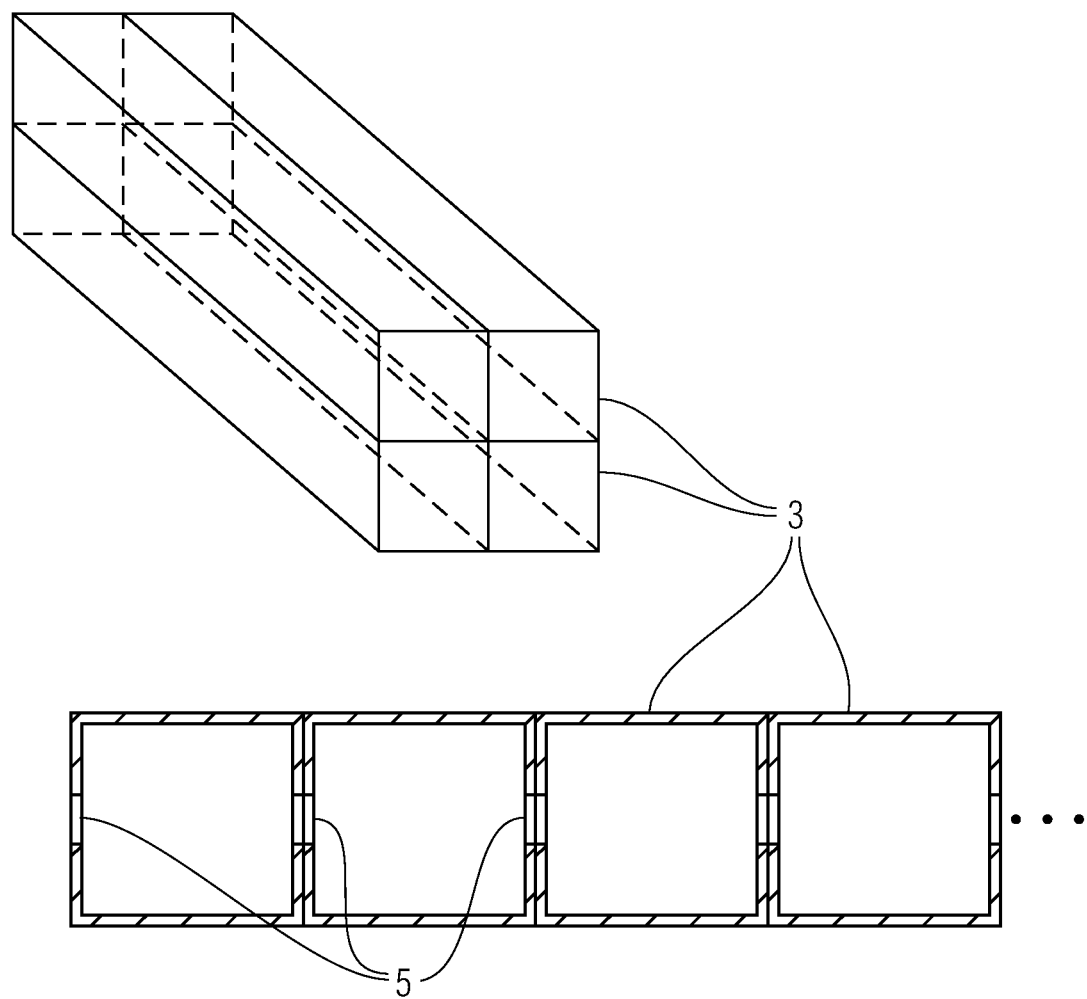
FIG. 8 shows exemplary emulation systems with connected containers.

FIG. 8 shows exemplary emulation systems with connected containers 3 in linear and/or stacked configurations. Containers 3 can vary in size such that additional or fewer peripherals can be installed on a single container 3, or containers 3 can be coupled together to provide additional peripherals. When coupled, adjoining walls of containers 3 can be removed such that a single cavity is formed within containers 3. When the containers are linearly coupled, all of the apertures are aligned such that an EMR beam can pass through all of the coupled containers. Container 3 walls can be retractable shutters for automated opening and closing. Each container 3 can be configured to automatically retract the shutter walls when desired atmospheric conditions are met within each container 3.

Although the invention has been described in detail with reference to certain preferred embodiments, variations and modifications exist within the spirit and scope of the invention as described and defined in the following claims.

The invention claimed is:

1. A system for testing under controlled emulated atmospheric conditions comprising:
 a first container comprising first six walls forming a first interior cavity and first and second aligned apertures on first and second opposing walls of the first six walls which open into the first interior cavity and are aligned to allow a beam of electromagnetic radiation to enter the first aperture into the interior cavity and exit the interior cavity out of the second aperture;
 a plurality of peripherals adapted to couple to the first six walls, wherein the plurality of peripherals are configured to adjust the temperature, pressure, and humidity within the first container;
 wherein each wall of the first six walls comprises an opening section such that retracting or removing the opening section creates an opening between the inside and outside of the first container to allow access to a second interior cavity of a second container when coupled with the second container.

2. The system of claim 1, further comprising the second container comprising second six walls forming the second interior cavity and third and fourth aligned apertures on opposing walls of the second six walls which open into the second interior cavity, wherein each wall of the second six walls comprises an opening section such that retracting or removing the opening section creates an opening between the inside and outside of the second container, wherein at least one wall of the first six walls is configured to couple to, wherein after coupling the first container to the second container, adjoining opening sections can be retracted or removed to create an opening connecting the first and second interior cavities to create a longer distance or larger volume for testing of a beam of electromagnetic radiation (EMR) transmitted through the first and second interior cavities.

* * * * *